Jan. 23, 1940.   C. A. BARBER   2,188,215
REVERSIBLE POWER CLUTCH
Filed Oct. 14, 1937
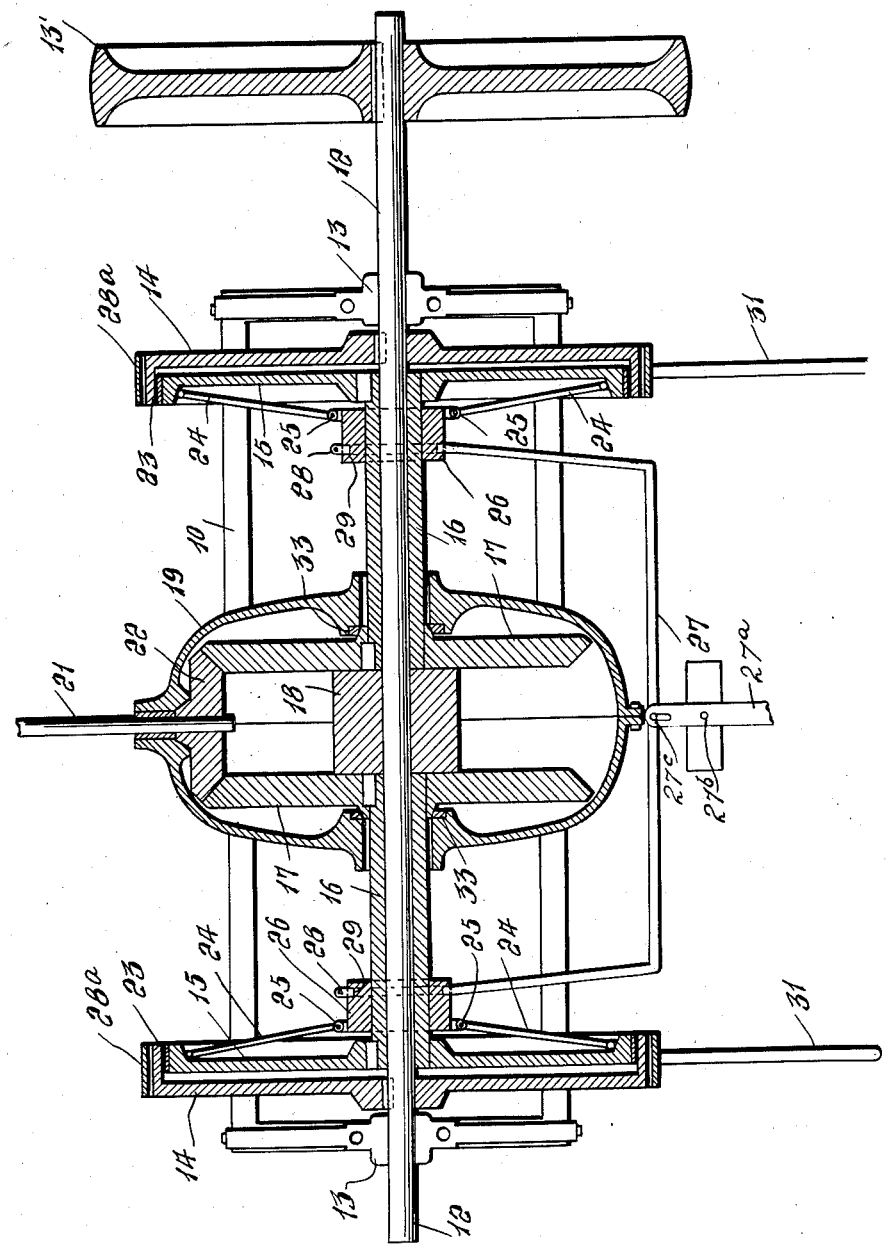
Inventor
C. A. Barber
By L. F. Rudolph
Attorney Patented Jan. 23, 1940

2,188,215

UNITED STATES PATENT OFFICE 2,188,215

REVERSIBLE POWER CLUTCH

Clarence A. Barber, Gridley, Kans.

Application October 14, 1937, Serial No. 169,036

2 Claims. (Cl. 74—378)

This invention relates to a clutch for use in the transmission of power from oil, gas or gasoline engines to well-drilling or other machinery, especially where it is necessary to reverse the power often and suddenly.

The prime object is to provide such a structure as will enable the operator to run the machinery in reverse with the same speed and power as in the forward motion with minimum silence and maximum efficiency.

The more specific objects and advantages will become apparent from a consideration of the description following taken in connection with accompanying drawing illustrating an operative embodiment.

In said drawing:

The view is in horizontal section.

Referring specifically to the drawing, 10 designates a suitable frame or support in the opposite ends of which bearings are provided in which a shaft 12 is removably journaled as at 13. A driven pulley 13' is keyed to shaft 12, preferably driving a belt.

Clutch drums or pulleys 14 are keyed to the shaft 12 and coacting with each of them are clutch arms 15. Said clutch arms are fixed on sleeves 16 which are journaled on the shaft 12 and which are independent of each other. Keyed to each sleeve 16 at the inner end is a gear wheel 17, which may be of the spiral tooth, ring type, or otherwise, as prefered. A suitable bearing block structure 18 for shaft 12 is disposed between the gears 17. A casing 19 surrounds the gears 17 and is constructed in a manner permitting ready inspection and adjustment of the gears.

Said casing 19 has a jack shaft 21 journaled therein, which is driven by the motor, engine or other operating power. An intermediate gear wheel 22 of the same type as gear wheels 17 is disposed between them and in mesh with each of them so that jack shaft 21 and pinion 22 drive gear wheel 17 in opposite directions. The casing 19 is preferably filled with grease so that the gears will be constantly and effectively lubricated.

The clutch arms 15 may be resilient or of any desired construction. When resilient they are normally disengaged from their respective drums or pulleys 14. They are adapted to be moved into frictional engagement with rims 23 of such pulleys or drums through outward radial movement of spokes or rods 24 fastened to them and pivoted at 25 to collars 26 which are slidable along the sleeves 16. An operating rod for the collars 26 is shown at 27, being a rigid structure generally of U-shape in plan and having rigid rings 28 or yokes loosely and removably secured in annular grooves 29 in said collars. An operating lever 27a, pivoted at 27b, may be connected to said rod 27 by a pin and elongated slot connection 27c.

In order to brake the action of the pulleys or drums 14, brake bands 28a of leather or any other preferred material may be disposed over the rim 23 of each of them, such bands being anchored as at 29a to the frame or support 10 and connected as at 30 to depressible levers 31 pivoted at 32 to said frame or support 10.

It will be realized that the parts are normally in the position of Figure 3, wherein all clutch arms 15 are in a neutral position, that is disengaged from the rims of the pulleys or heads 14. With power applied to the shaft 21, shaft 12 and pulley 13' are driven. In order to drive the shaft 12 and pulley 13' in one direction, the rod 27 is pushed to the right which slides the right hand collar 26 to the right, moving the rods 24 connected thereto outwardly and springing the arms 15 into frictional braking contact with the adjacent drum 14. In driving the shaft 12 and pulley 13' in the opposite direction, the rod 27 is pushed to the left, thereby and in a similar manner, sliding the collar 26 and operating the rods 24 and clutch arms 15, causing the other sleeve 16 and gear 17 to rotate in the opposite direction. It will be seen that the parts tend to disengage one set of clutch arms as the other set of clutch arms is applied.

Suitable, preferably adjustable bearings may be provided between the gears 17 and the casing 19 as at 33.

Various changes may be resorted to provided they fall within the spirit and scope of the invention.

I claim as my invention:

1. A clutch structure having a driving shaft, a gear wheel thereon, a driven shaft having drums thereon, gear wheels meshing with and driven by the first gear wheel, sleeves rotatable on said driven shaft each carrying one of the second mentioned gear wheels, a selectively operable clutch part for each drum fastened on the associated sleeve, manually engageable operating means for the clutch parts to apply one as the other is released, said operating means including collars, one collar being located and slidable on each sleeve between the clutch part thereon and the adjacent second mentioned gear wheel.

2. A clutch structure having a driving shaft, a gear wheel thereon, a driven shaft having drums thereon, gear wheels meshing with and driven by the first gear wheel, sleeves rotatable on said driven shaft each carrying one of the second mentioned gear wheels, a selectively operable clutch part for each drum fastened on the associated sleeve, operating means for the clutch parts including collars, one collar being located and slidable on each sleeve between the clutch part thereon and the adjacent second mentioned gear wheel, and means connected to both collars to simultaneously operate them whereby one clutch part will be applied as the other clutch part is released.

CLARENCE A. BARBER.